US006409097B1

(12) United States Patent
McCauley

(10) Patent No.: US 6,409,097 B1
(45) Date of Patent: Jun. 25, 2002

(54) YARD BLOWER FOR DISTRIBUTING YARD CARE MATERIAL

(76) Inventor: William H. McCauley, 23 Abbeville St., Due West, SC (US) 29639

( * ) Notice: Subject to any disclaimer, the term of this patent is extended or adjusted under 35 U.S.C. 154(b) by 0 days.

(21) Appl. No.: 09/549,769

(22) Filed: Apr. 14, 2000

Related U.S. Application Data

(60) Continuation-in-part of application No. 09/390,892, filed on Sep. 7, 1999, now abandoned, which is a division of application No. 09/090,854, filed on Jun. 4, 1998, now Pat. No. 5,947,384.

(51) Int. Cl.[7] ............ B05B 15/00
(52) U.S. Cl. ............ 239/289; 239/304
(58) Field of Search ............ 239/152–154, 239/304, 307, 308, 379, 652–654, 655, 289, 345, 346, 77; 406/38, 98, 141, 153, 122; 15/328, 321; 251/6, 9

(56) References Cited

U.S. PATENT DOCUMENTS

| | | | | | |
|---|---|---|---|---|---|
| 2,112,603 | A | | 3/1938 | Perron | |
| 3,223,286 | A | | 12/1965 | Sawyer | 239/355 |
| 3,539,110 | A | | 11/1970 | Kobayashi | 239/154 |
| 3,724,818 | A | * | 4/1973 | Roger | 251/9 |
| 3,758,036 | A | | 9/1973 | Bauder et al. | 239/154 |
| 3,776,459 | A | | 12/1973 | Bonvicini | 239/77 |
| 3,900,184 | A | * | 8/1975 | Burke et al. | 251/6 |
| 4,065,093 | A | * | 12/1977 | Phillips | 251/6 |
| 4,089,441 | A | | 5/1978 | Cole et al. | 239/154 |
| 4,474,327 | A | | 10/1984 | Mattson et al. | 239/143 |
| 4,993,639 | A | | 2/1991 | Hata | 239/346 |
| 5,190,225 | A | | 3/1993 | Williams | 239/154 |
| 5,240,186 | A | | 8/1993 | Dobbins et al. | 239/154 |
| 5,392,996 | A | | 2/1995 | Ussery | 239/654 |
| 5,429,278 | A | | 7/1995 | Sansalone | 222/195 |

FOREIGN PATENT DOCUMENTS

| | | | | |
|---|---|---|---|---|
| CH | 358274 | | 12/1961 | 239/154 |
| FR | 1232915 | * | 10/1960 | 239/77 |
| IT | 575602 | * | 4/1958 | 239/77 |
| IT | 694142 | * | 9/1965 | 239/77 |

* cited by examiner

*Primary Examiner*—Lesley D. Morris
(74) *Attorney, Agent, or Firm*—Cort Flint; Henry S. Jaudon

(57) ABSTRACT

Apparatus for distributing yard care material is disclosed using a yard blower having a hand held blower tube. A dry material feed system is affixed to a tube section of the blower tube which introduces dry material into an air flow generated by the blower by means of a feed opening formed in the tube section. An injection gate controls the amount of dry material dispensed from the feed hopper into the air flow. The use of a slopping wall allows the dry material to be fed by gravity. Additionally, a liquid feed system may be provided which is secured to the dry material feed hopper to feed a liquid yard treatment material is also feed. Advantageously, a liquid feed conduit is formed on the exterior of the blower tube and has an outlet end disposed a distance from the air exit end of the blower tube so that the liquid is injected into the air flow as it exits the blower tube for atomization and distribution to a treatment area. The apparatus may be provided integral with a special tube section which can be sold and interfitted with a blower tube of an existing or new yard blower.

25 Claims, 9 Drawing Sheets

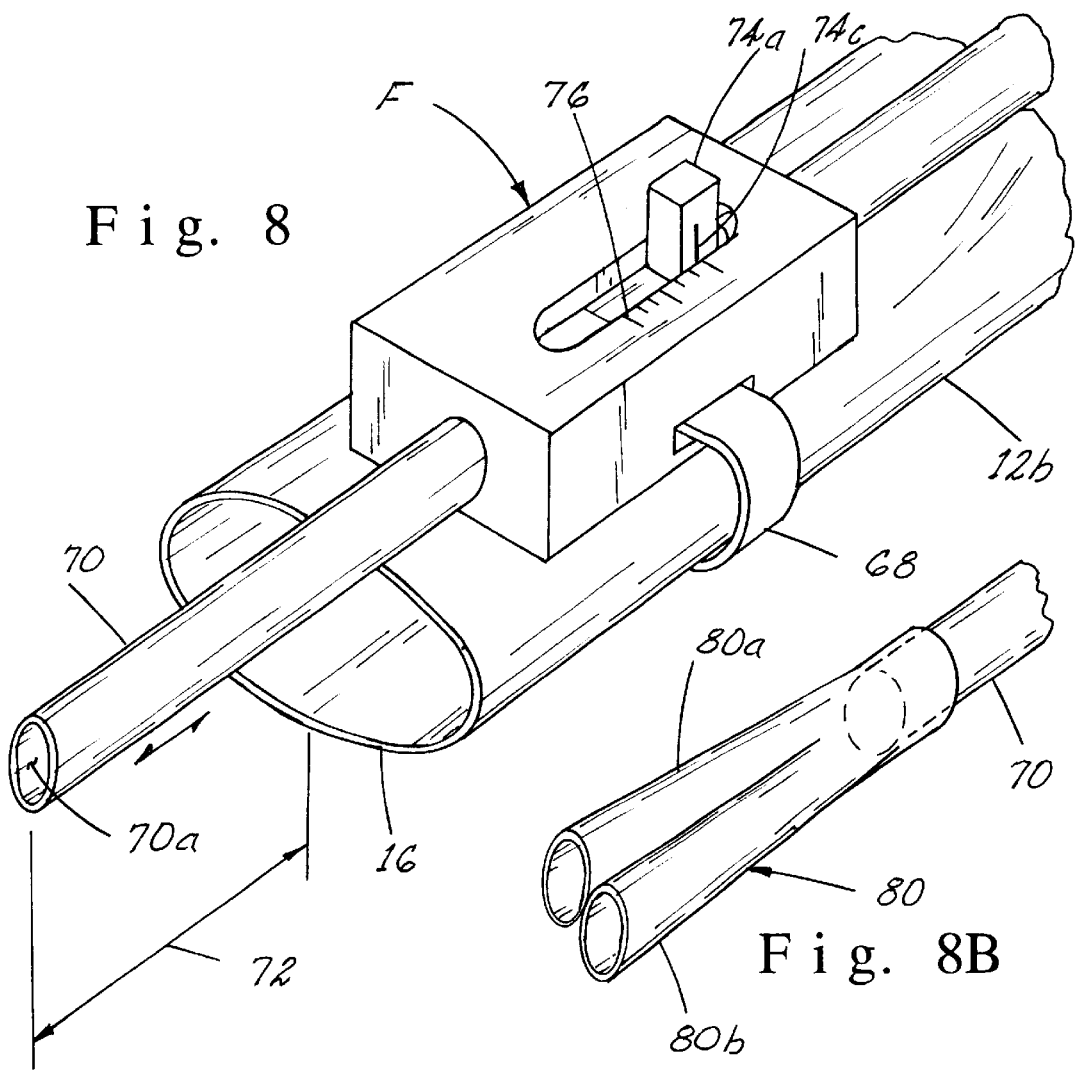
Fig. 8
Fig. 8B
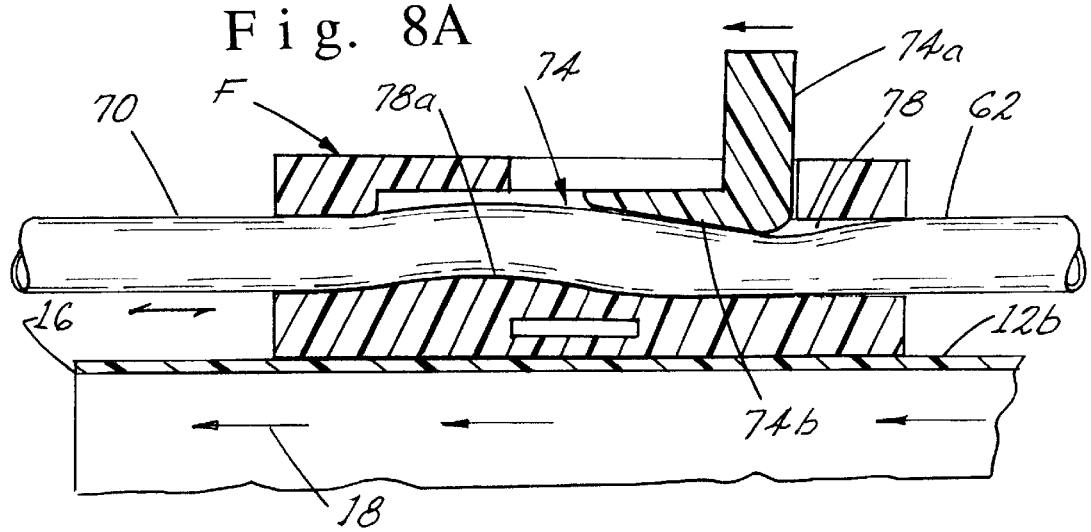
Fig. 8A

YARD BLOWER FOR DISTRIBUTING YARD CARE MATERIAL

This application is a CIP of Ser. No. 09/390/892 filed Sep.7, 1999, abandoned, which is a Div. of Ser. No. 09/090/854 filed Jun. 4,1998, now U.S. Pat. No. 5,947,384.

BACKGROUND OF THE INVENTION

The invention relates to apparatus for distributing liquid treatment materials, more particularly to an apparatus using a portable blower for distributing the material as a fog or fine mist to a treatment area using an air flow generated by the blower through a blower tube which may be used with new or existing equipment.

Heretofore, various devices have been known for the application of liquid or dry materials for lawn, plants, gardens and the like, wherein a dry or liquid material is either mixed with a water or air stream. For example, U.S. Pat. No. 5,392,996 discloses an attachment for a portable leaf blower for distributing a pesticide dust. U.S. Pat. No. 4,474,327 discloses a hand held blower which distributes a granular fertilizer using a discharge air stream from the blower. The device requires a venturi throat for providing a vacuum source for drawing the fertilizer particles into the air stream. U.S. Pat. No. 5,429,278 discloses a portable garden powder duster. U.S. Pat. No. 4,089,441 discloses a hopper feeder for a portable blower for dispensing a powder material into an air flow. U.S. Pat. No. 3,776,459 disclosed a sprayer attachment for leaf blower which dispenses a liquid insecticide.

While the above prior art has certain suitable characteristics, they do not provide a simple, easy to use, and reliable apparatus for dispensing a liquid and/or dry lawn treatment material either as an a new or a retrofit an existing yard blower.

Accordingly, an object of the present invention is to provide a portable yard blower having a blower tube through which an air flow is created in which a liquid mist or fog may be easily and reliably dispensed.

Still another object of the invention is to provide apparatus for retrofitting an existing yard blower for distributing a liquid or dry treatment material in an easy and convenient manner.

Another object of the invention is to provide an air blower having a blower its tube through which an air flow is generated and a liquid and/or dry material may be dispensed using gravity feed eliminating the need for relatively complex feeding mechanisms.

Another object of the present invention is to provide an air blower having effective feeding of a dry and/or liquid yard treatment material at an effective portion of the air stream so that the material is effectively distributed to the lawn or other treatment area.

SUMMARY OF THE INVENTION

The above objectives are accomplished according to the present invention by providing fogger apparatus for distributing a mist of liquid treatment materials which comprises a portable blower for creating an airflow having an inlet and an outlet. A handheld blower tube is connected in fluid communication to the outlet of the blower though which said airflow is delivered. The blower tube has an exit end through which the exiting airflow exits the blower tube. A container contains a liquid material to be dispensed as a mist, and a feed tube is connected to the container for delivering liquid from the container. A dispensing nozzle is disposed in fluid communication with the feed tube having a free end terminating near the exit end of the tube for distributing liquid material into the exiting air flow. A spray control device is carried by the blower tube between the feed tube and dispensing nozzle for controlling the characteristics of the mist formed by the liquid being injected into the exiting airflow. The spray control device includes a valve for controlling the flow of go liquid material through the tube so that the amount of liquid material distributed into the exiting airflow is metered. Advantageously, the valve may include a valve passage and a valve element for adjustably blocking the valve passage to control the amount of fluid through the valve passage and hence the feed tube. Preferably, the feed tube extends into and through the valve passage and a protuberance protrudes into the valve passage which cooperates with the valve element to selectively pinch off the feed tube to control the flow of liquid there through. The feed tube may be pulled toward or away from the free end of the blower tube to vary the distance between the free end of a dispensing nozzle and the free end of the blower tube to thereby further control the mist characteristics of the mist resulting from injection of the liquid material into the exiting airflow. Advantageously, the valve passage and valve element which closes off the feed tube against the protuberance allow the feed tube to be pulled toward and away from the exit end to adjust the longitudinal position of the dispensing nozzle so that the position of the free end of the nozzle may be set relative to the free end of the blower tube. The dispensing nozzle may include a plurality of dispensing barrels in communication with the feed tube. Advantageously, the containers which contain liquid to be dispersed include a stack of containers containing a bacterial breeding solution and/or a chemical batch, the top one of the tanks being a dispensing container from which fluid is drawn.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3A is an alternate embodiment for a liquid feeding system according to the invention;

FIG. 8 is an enlarged perspective view illustrating a spray control device for controlling the mist or fog emitted from a fogger apparatus according to the invention;

FIG. 8B is an alternate embodiment of a nozzle for the fogger of FIGS. 7 and 8;

FIG. 8A is a sectional view of FIG. 8;

DESCRIPTION OF A PREFERRED EMBODIMENT

Figure 1:
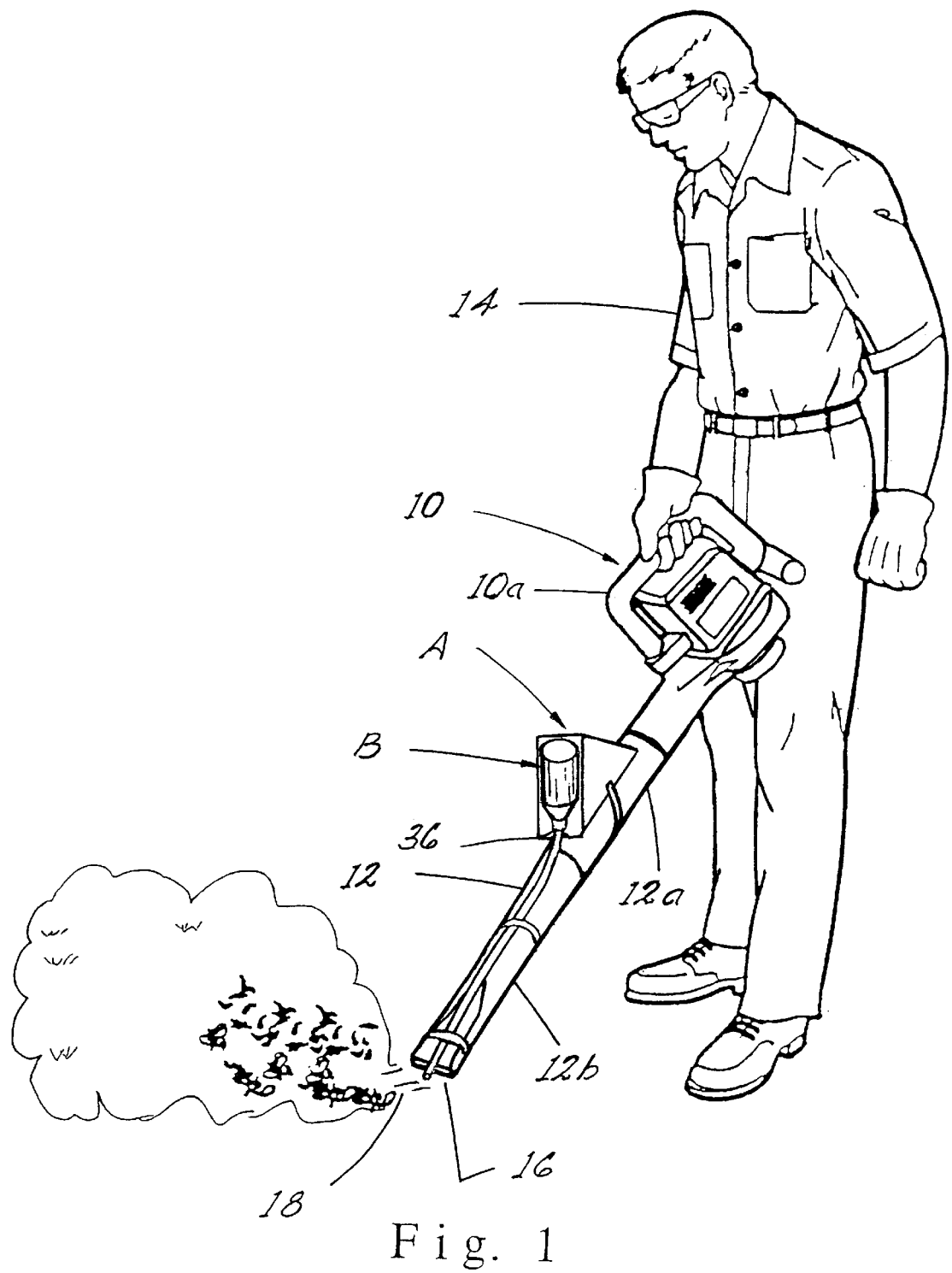
FIG. 1 is a perspective view of a handheld air blower and apparatus for feeding a dry and/or liquid material for yard treatment and the like in accordance with the invention.
Figure 2:
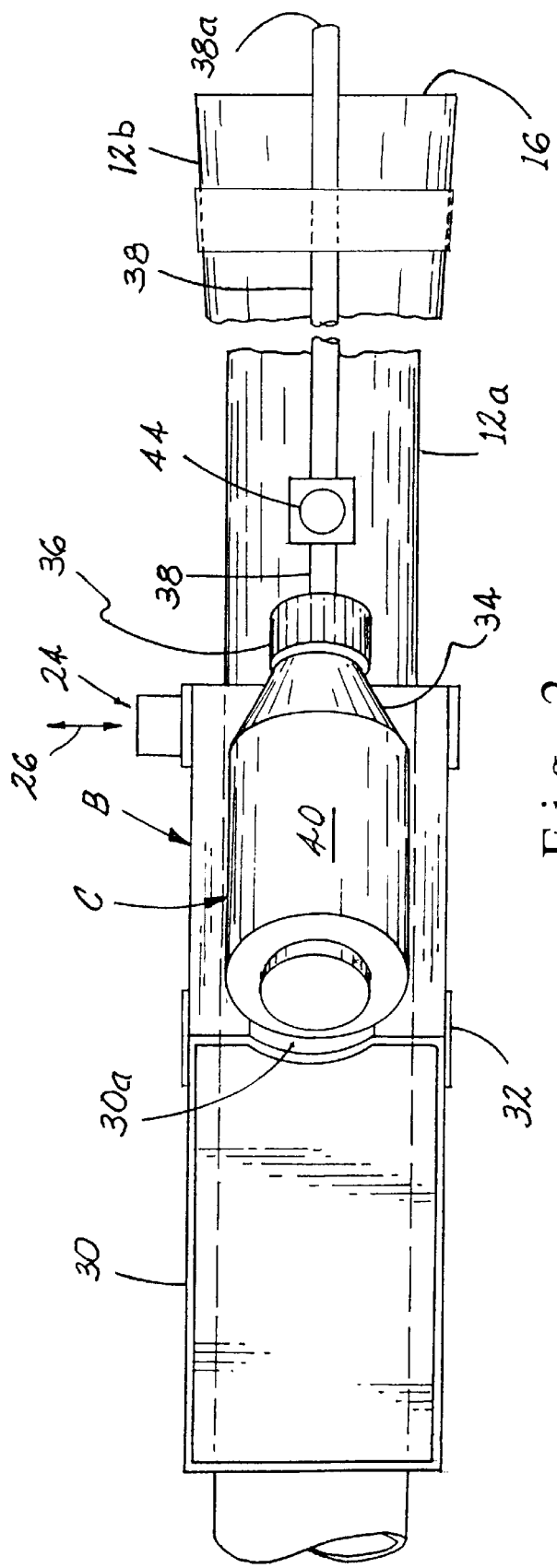
FIG. 2 is a top plan view of apparatus for dispensing liquid and/or dry yard treatment material using an air blower in accordance with the present invention.

Referring now to the drawings, the invention will be described in more detail.

FIG. 1 illustrates apparatus for distributing a liquid or dry yard treatment material, designated generally as A, which includes a portable blower 10 which generates an air flow that is distributed through a blower tube 12 having tube sections 12a and 12b fitted together. Blower 10 may be provided with a handle 10a which can be held by the hand of a user 14. Alternately, the air blower may be provided with a back pack frame for carrying the blower and the hand held tube may be connected by a flexible hose. Blower tube 12 has an exit end 16 through which air flow 18 exits the blower tube. A feed system for feeding a dry material into tube 12 is illustrated in the form of a feed hopper, designated generally as B, affixed to blower tube 12.

Figure 5:
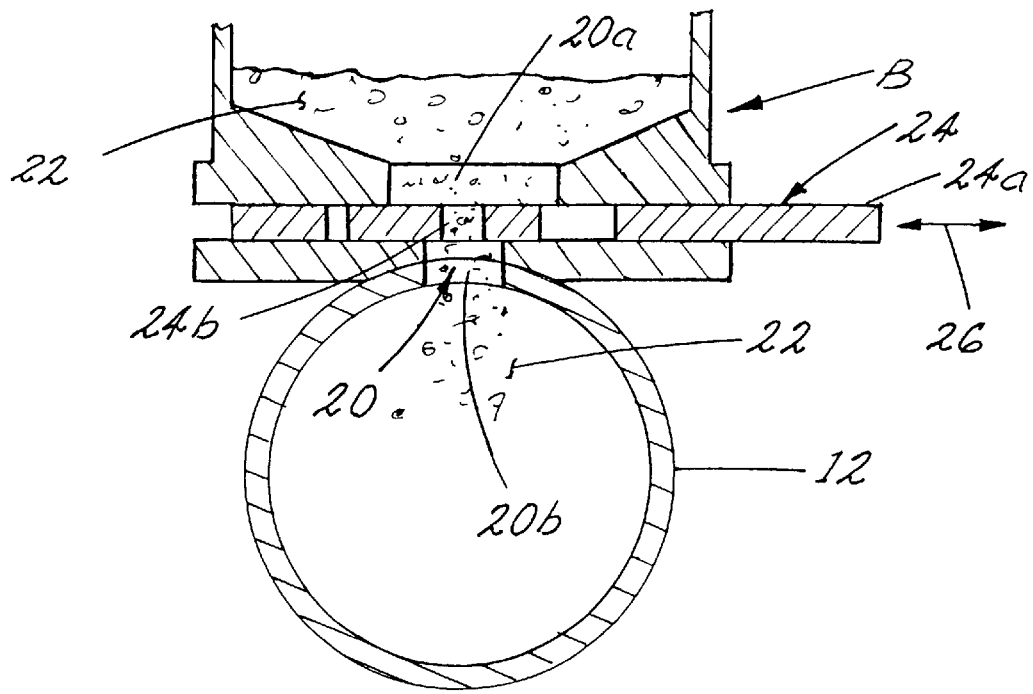
FIG. 5 is a sectional view taken along line 5—5 of FIG. 4 according to the invention.

As can best be seen at FIG. 5, a feed opening, designated generally as 20, is formed for receiving dry material 22 from feed hopper B. The dry material is then mixed with air flow 18 passing through the blower tube 12. An injector gate assembly, designated generally as 24 is disposed between feed hopper B and feed opening 20 which includes an injector gate 24a having a gate opening 24b for progressively opening and closing the feed opening. In this manner the amount of dry material introduced into the air flow is controlled. It is noted that feed opening 20 comprises a first part 20a formed in hopper B and a second part 20b formed in blower tube 12. Gate assembly 24 includes injection gate 24a in the form of an adjustable member which slides in the direction of arrow 26 having gate opening 24b, the remainder of which is solid. The adjustable injection gate is disposed between the first and second parts of feed opening 20 so that gate opening 24b may be aligned more or less with the feed opening to vary the amount of dry material distributed there-through. The alignment of gate opening 24b with the feed opening defines a variable valve aperture. The amount of dry material distributed is also determined by the velocity of the air flow in the blower tube which may be adjusted using conventional means by employing either a variable speed controlled blower or multi-speed blower motor and switch.

Figure 3:
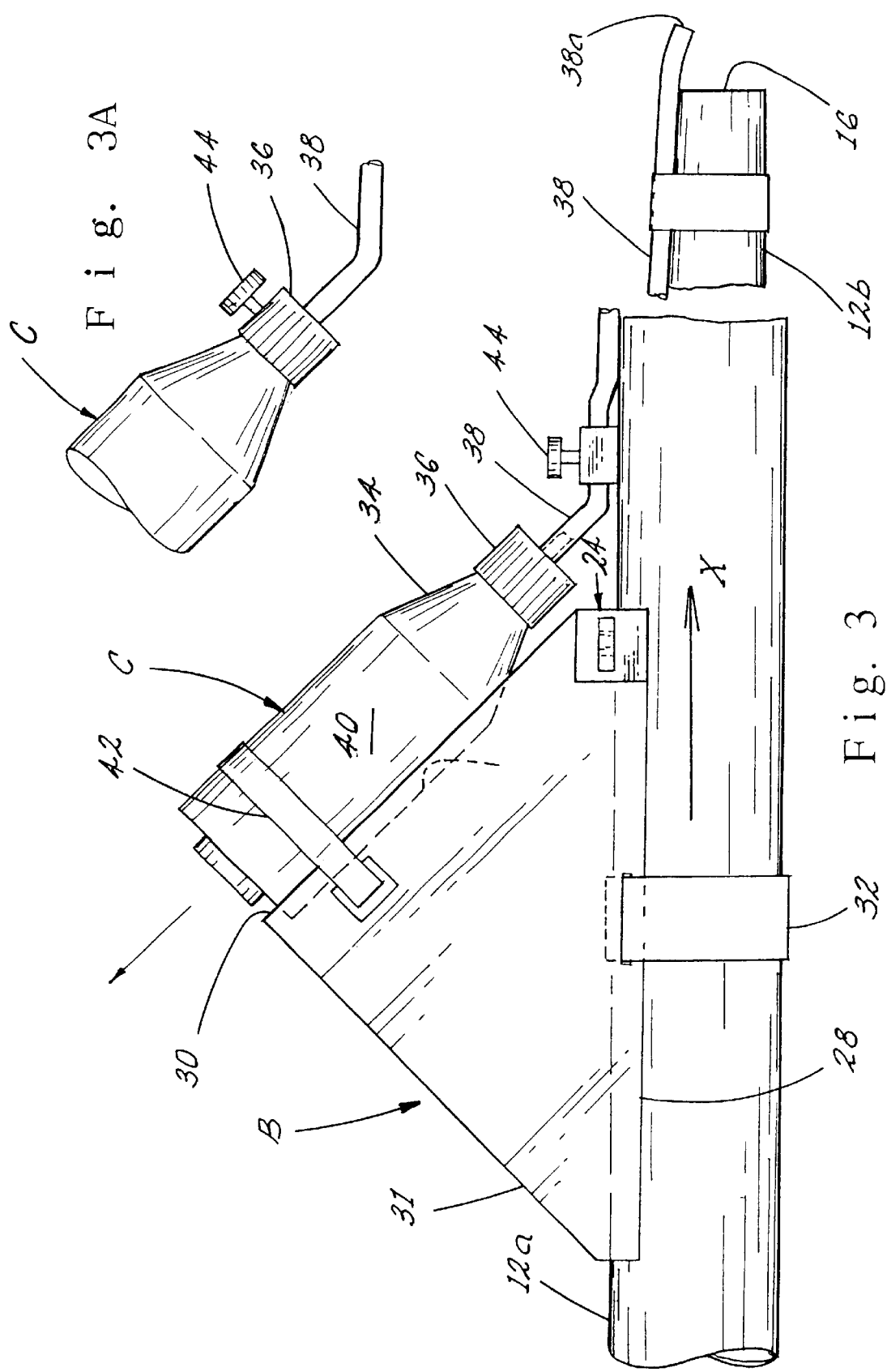
FIG. 3 is a side elevation illustrating an apparatus for feeding dry and/or liquid material for introduction into an air stream of a air blower in accordance with the present invention.

Preferably, hopper B includes a first wall 28 generally parallel to a flow axis "X" of blower tube 12, and a second wall 30 disposed at an angle to the flow axis (FIG. 3). By this means, dry material 22 is fed by gravity through feed opening 20 into the air flow. This eliminates the need for mechanical feeding means such as augers, venturis, and the like, and results in a more simplified reliable feeding system. Likewise, the injection gate assembly provides a reliable control over the amount of dry material injected into the air flow. By introducing the dry material into the air flow upstream from exit end 16 of the blower tube, a good mixing of the dry material and air flow are achieved before the air flow exits the tube 12b. Further, in order to prevent blow back through the hopper gate, a top cover 31 may be provided.

Figure 6:
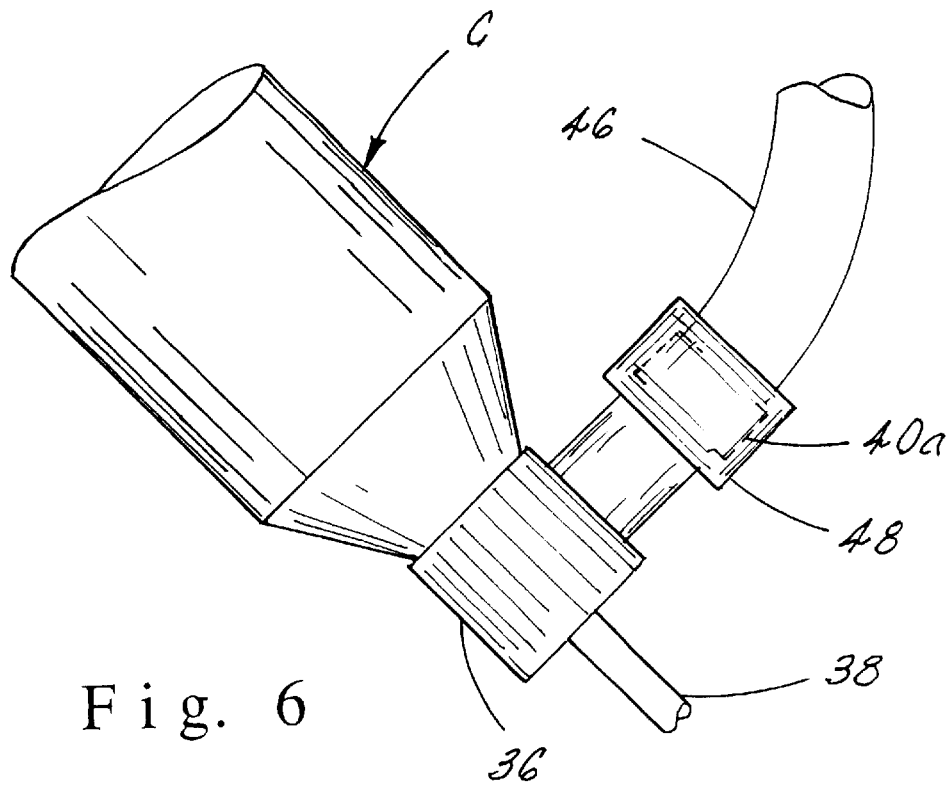
FIG. 6 is an elevation illustrating an alternate means for supplying a liquid to a liquid feeding system according to the invention.

Preferably wall 30 is sloped at an angle of about 45 degrees to flow axis X, so that a top 31 of the hopper B is held in a position which is approximately horizontal (FIGS. 1 and 3). Any suitable means may be utilized for attaching hopper 30 to blower tube 12, such as a velcro strap 32. Alternately, dry chemicals may be fed from a cartridge insert or remote source; or the hopper may be made part of an accessory tube to be attached to the tube of an existing blower. A liquid feed system for feeding a liquid yard treatment material may also be utilized with the invention, and quite advantageously may be combined with the dry feed system so that either a dry or liquid yard treatment material may be selected. Alternately, a dry and liquid material may be distributed simultaneously for yard treatment and the like. The liquid feed system comprises a source of a liquid, which in the illustrated embodiment of FIGS. 1–4, includes a container C having a neck portion 34 which tapers down to a closure cap 36. A feed conduit 38 is connected by means of cap 36 to communicate with a liquid 40 carried inside container C. Liquid feed conduit 38 extends along an exterior of blower tube 12 and advantageously terminates at an outlet end 38a slightly pass exit end 16 of blower tube 12. The liquid is thus injected into the air flow and atomized for being carried away and dispensed onto an area for treatment. Advantageously, container C is strapped onto hopper B by means of a velcro strap 42. By strapping container C onto slopping wall 30, a gravity feed of the liquid is also possible. For this purpose, slopping wall 30 may be made to have a slightly concave contour at 30a for cradling the container. Alternately, an attachment means between the concave contour and the container can be provided. By carrying the feed conduit on the outside of the tube, a wetting of the interior of the tube is avoided as may cause an impairment to the flow of dry material if such should be done in conjunction with or shortly after liquid feeding. The valve 44 is provided for controlling the amount of liquid fed through the feed conduit 38. Means for controlling the amount of liquid delivered to the conduit and into the air flow is provided by the valve, the diameter of feed conduit 38, and the velocity of the air flow in the tube. FIG. 3A shows the valve carried directly on the cap of the container rather than in the conduit. Valve 44 may be any continuously variable valve having a variable metering orifice. FIG. 6 shows an alternate arrangement where instead of using a batch supply of liquid in a container C, a continuous supply of liquid such as connection to a water supply source provided by a utility company can be utilized. In this case, a conventional garden hose 46 is connected to cap 36 by means of a female hose coupling 40a. In this manner a continuous supply of liquid may be fed to the air blower rather than a batch method. In this case, a concentrated second liquid may also be utilized, contained in container C, that is metered into the continuous water flow.

Figure 4:
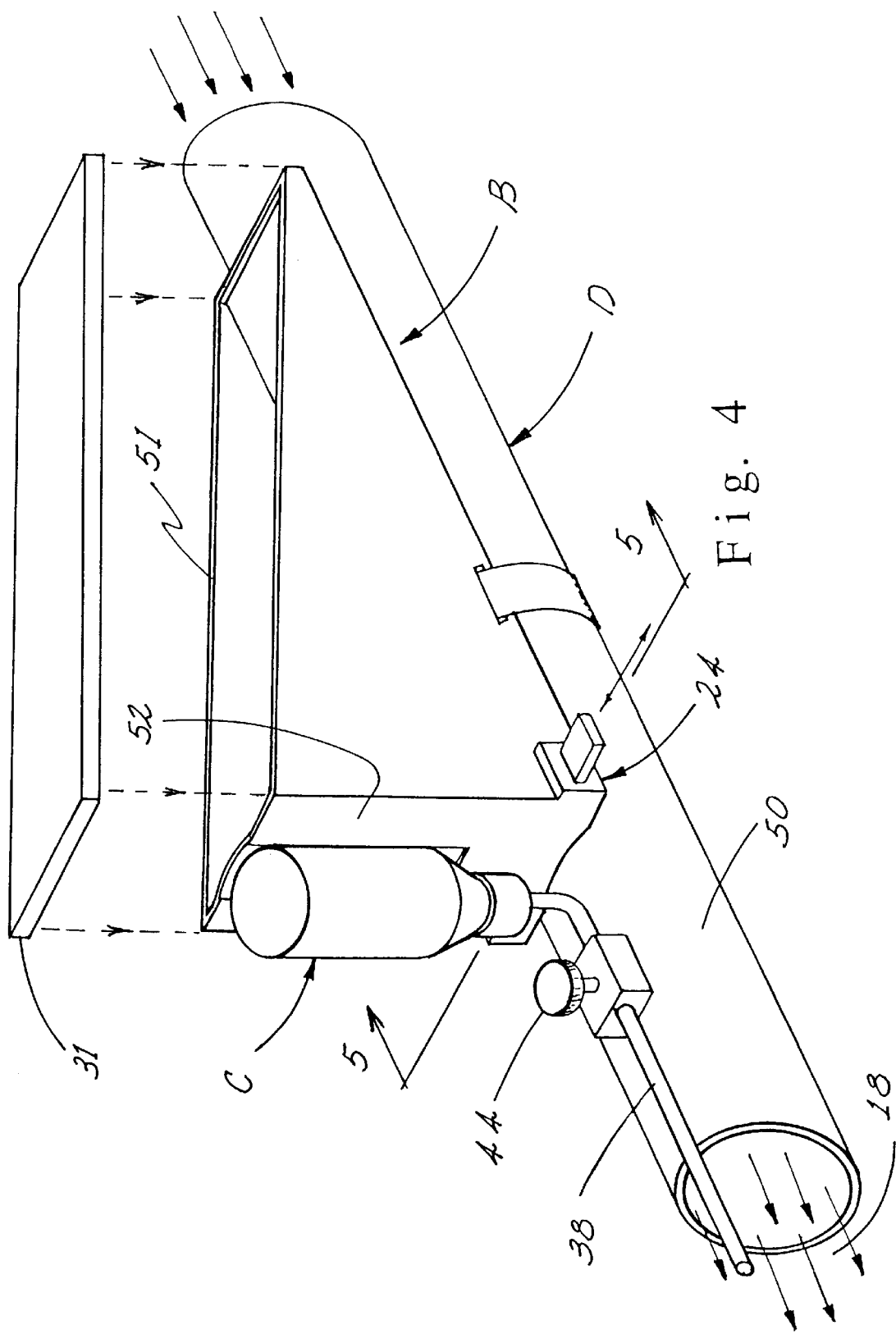
FIG. 4 is a perspective view illustrating apparatus for feeding dry and/or liquid yard treatment material to an air stream according to the invention.

While the invention has been illustrated in terms of the hopper being strapped to blower tube section 12a when the invention may be utilized in connection with an existing air blower, it is to be understood that the invention may also be built into the air blower and supplied new. Alternately, instead of being strapped to a tube, hopper B may be made as one piece with a special tube section (not shown), and fitted into the blower tube of a conventional or new yard blower. Likewise, instead of being supplied for use with an existing air blower, a strapped hopper may be supplied with a special tube section D, as shown in FIG. 4 to be utilized in a fitted arrangement with an existing air blower tube. In this case, the feed tube opening of the injector gate assembly 24 is already formed in tube section 50, whereas in the other cases it is necessary to drill a hole in a preexisting tube section. In FIG. 4, an alternate arrangement is also shown wherein a perpendicular wall 52 rather than a 45° sloping wall is utilized which may be advantageous in the case of some air blower feeding systems. Once again, the hopper B is made so that a top 51 becomes approximately horizontal when the blower is held and in use.

While the invention is illustrated employing a dry and a liquid material feed system which is highly advantageous, it is to be understood that the invention may be exploited with only one or the other.

Figure 7A:
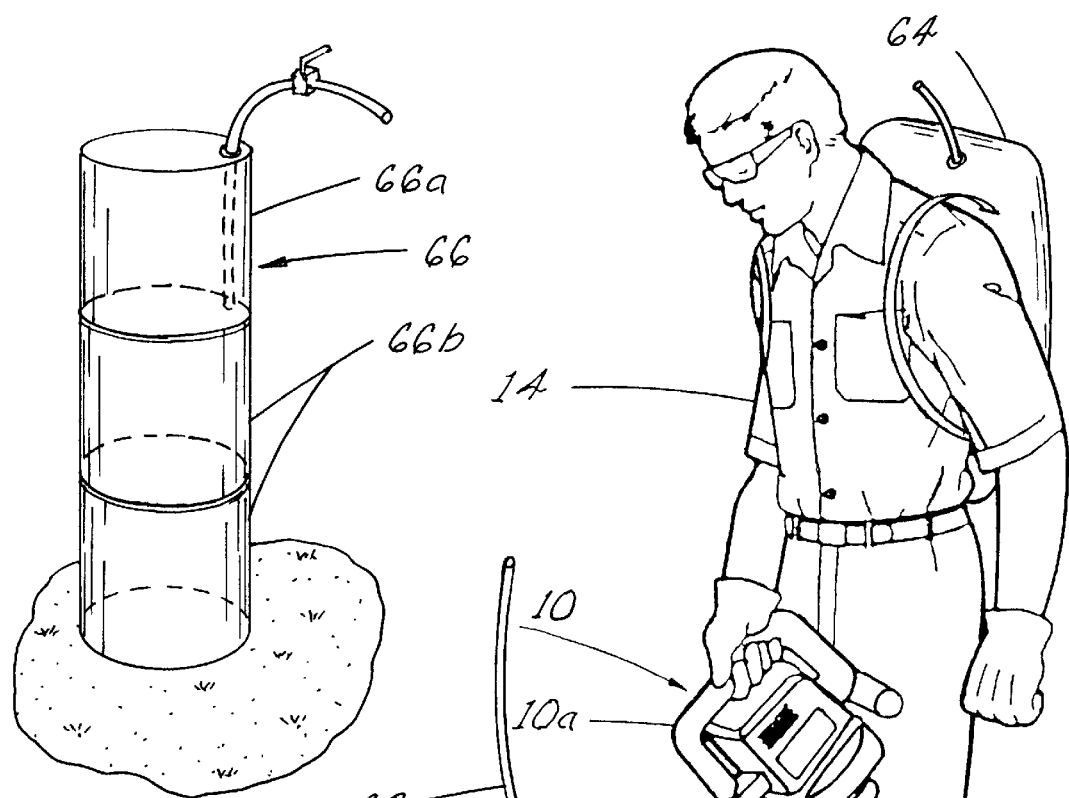
FIG. 7A is a perspective view of a gravity fed storage tank system for delivering a fluid to the fogger apparatus of a handheld blower according to the invention.
Figure 7:
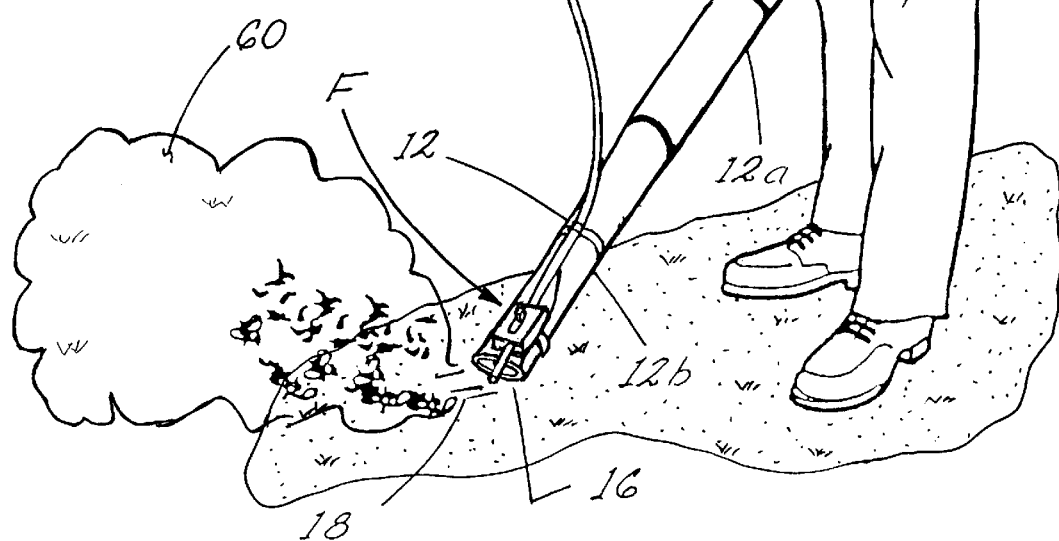
FIG. 7 is a perspective view of an operator holding a handheld air blower and fogger apparatus according to the invention for dispensing a fine mist or fog application as an insecticide or otherwise applying a chemical for best control, plant and grass nutrients, or animal or insect control.

In particular, the invention is advantageous for dispensing only a liquid material wherein the invention is utilized as a fogger or misterizer, as can best be seen in FIGS. 7 through 10. Referring to the drawings in more detail, a spray control device, designated generally as F, is affixed near the end of blower tube section 12b for providing and controlling the fineness of the droplets in a spray mist or fog 60 when the invention is utilized as a fogger. In this application, the invention may be advantageously utilized to control mosquitoes and other insects, as well as apply nutrients, or insecticides and other pest controls, including application to animals. A fluid dispensing tube 62 delivers a fluid to spray control device F. The fluid, insecticides, etc., may be gravity fed and come from a backpack 64 or may come from a reservoir 66. In the illustrated embodiment of FIG. 7A, reservoir 66 comprises a top tank or reservoir 66a which may be stacked upon two other tanks or containers 66b. This places the fluid reservoir at a sufficient height for gravity feed to the device being utilized around the yard. Lower containers 66b may be filled with the same fluid and move sequentially to the top as top tank or container 66a is emptied. In one particularly advantageous application, the containers are breeding tanks which contain a bacterial solution that creates a fog of *Bacillus thuringiensis* israelensis berliner dispensed for mosquito control. *Bacillus thuringiensis* (B.t.) is a living microorganism that kills certain insects and is used to kill unwanted insects, particularly caterpillars, mosquito larvae, and beetle larvae. As is well known in the insecticide art, under certain conditions bacteria forms spores. Spores are the dormant stage of the bacterial life cycle as the organism waits for better growing conditions. Unlike many other bacteria, when B.t. creates spores it also creates a protein crystal. This crystal is the toxic component of B.t. After the insect ingests B.t., the crystal is dissolved in the insect's alkaline gut and insect soon stops feeding and starves to death. Thus containers 66 may be 3 to 5 gallon containers in which the bacteria breeds to form the toxic B.t. While gravity feed is the simplest and most economical, it is to be understood, of course, that pump arrangements and other means of feeding fluid to the device may be utilized.

As can best be seen in FIG. 8, control device F is mounted near the end of blower tube section 12b by means of a strap connection 68, it being understood that other attachment means may also be utilized, or that control device F could be made integral with tube section 12b. A dispensing nozzle or tube 70 extends beyond exit end 16 of blower tube section 12b so that fluids dispensed from end 70a of the tube mixes with airflow 18 exiting blower tube 12 to create a mist or fog. A distance, indicated by arrows 72, between the exit end 16 of blower tube 12 and exit end 70a of dispensing tube 70 determines the fineness composition and type of mist or fog emitted from the device. In addition, the characteristics of the fog may be further controlled by the setting of a valve, designated generally as 74, incorporated into spray control device F. Valve 74 controls the fluid flow through fluid tube 62. In the illustrated embodiment of FIG. 8A, valve 74 includes an actuator 74a having a valve element 74b which pinches off the fluid line 62 more or less to control the flow of fluid through the tube and hence determine the characteristics of the spray or fog emitted from outlet tube 70, alone, or along with the adjustment of distance 72. Indices are illustrated at 76 for setting actuator 74a in combination with a marker 74c. There is a valve passage 78 extending through the housing of spray control device F through which fluid dispensing tube 70 extends. There is a protuberance 78a extending into the passage which cooperates with valve element 74b to control the flow of fluid through tube 70. When the valve element slides to its left most position, the flow of fluid will be cut off. In its right most position, the most fluid is allowed. Passage 78 also allows for adjusting the position of the free end of dispensing nozzle 70 relative to the free end of blower tube 12. Other means, such as straps, can be used to adjustably attach tube 70 to the blower tube without valve 74, which can be provided separately. As can best be seen in FIG. 8B, a dual nozzle 80 is illustrated attached to the end of tube 70 for also varying the pattern or flow of mist or fog dispensed from tube 70. Nozzle 80 includes divergent first barrel and second barrels 80a and 80b.

Figure 9A:
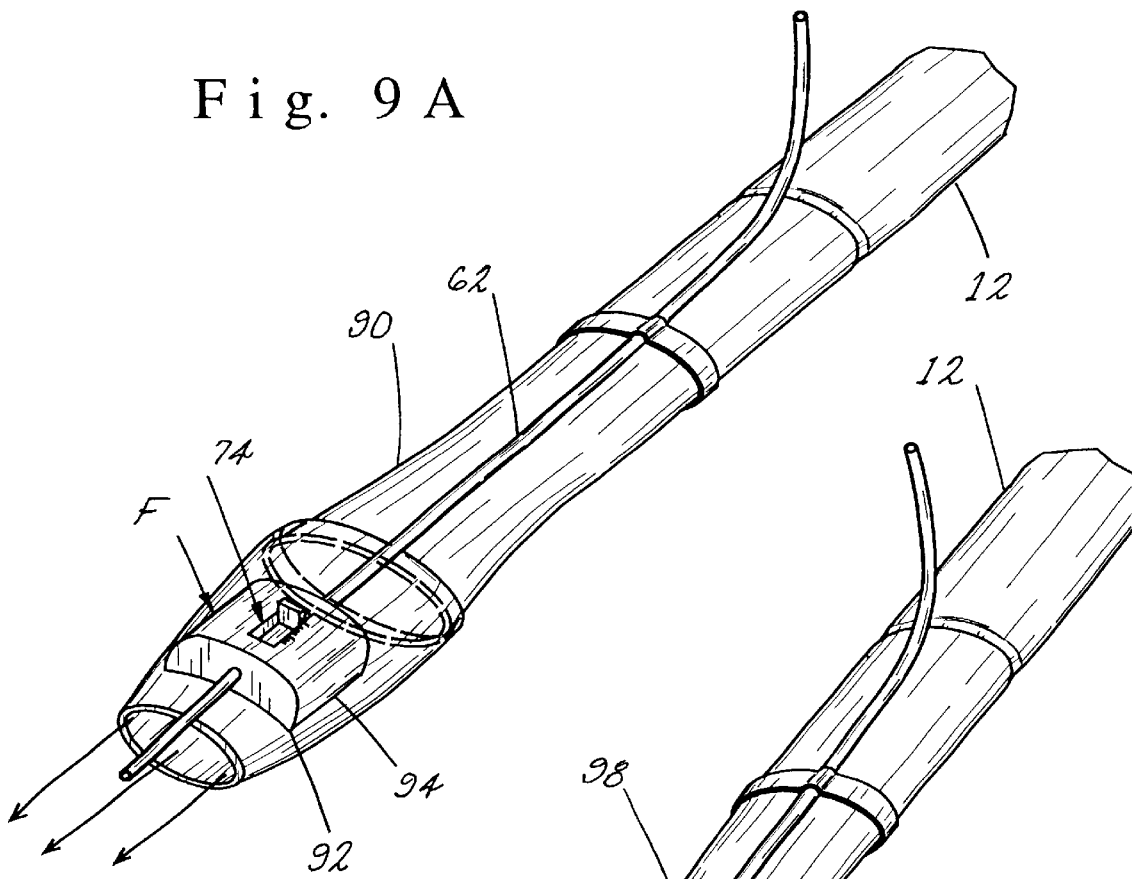
FIG. 9A is a perspective view of an alternate embodiment of a fogger nozzle section according to the invention.
Figure 9B:
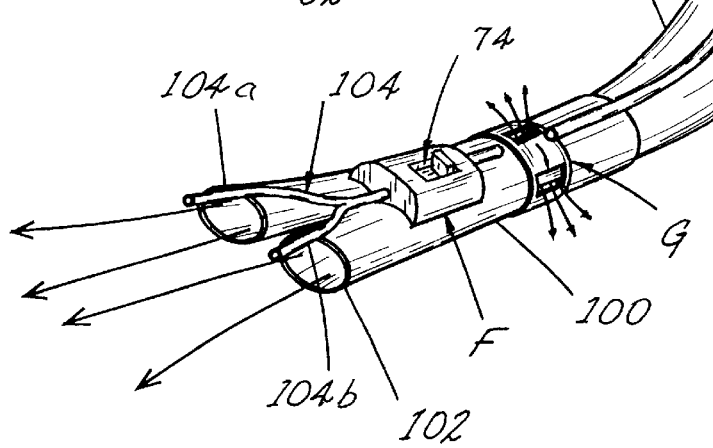
FIG. 9B is an alternate embodiment of a fogger nozzle section according to the invention.
Figure 10:
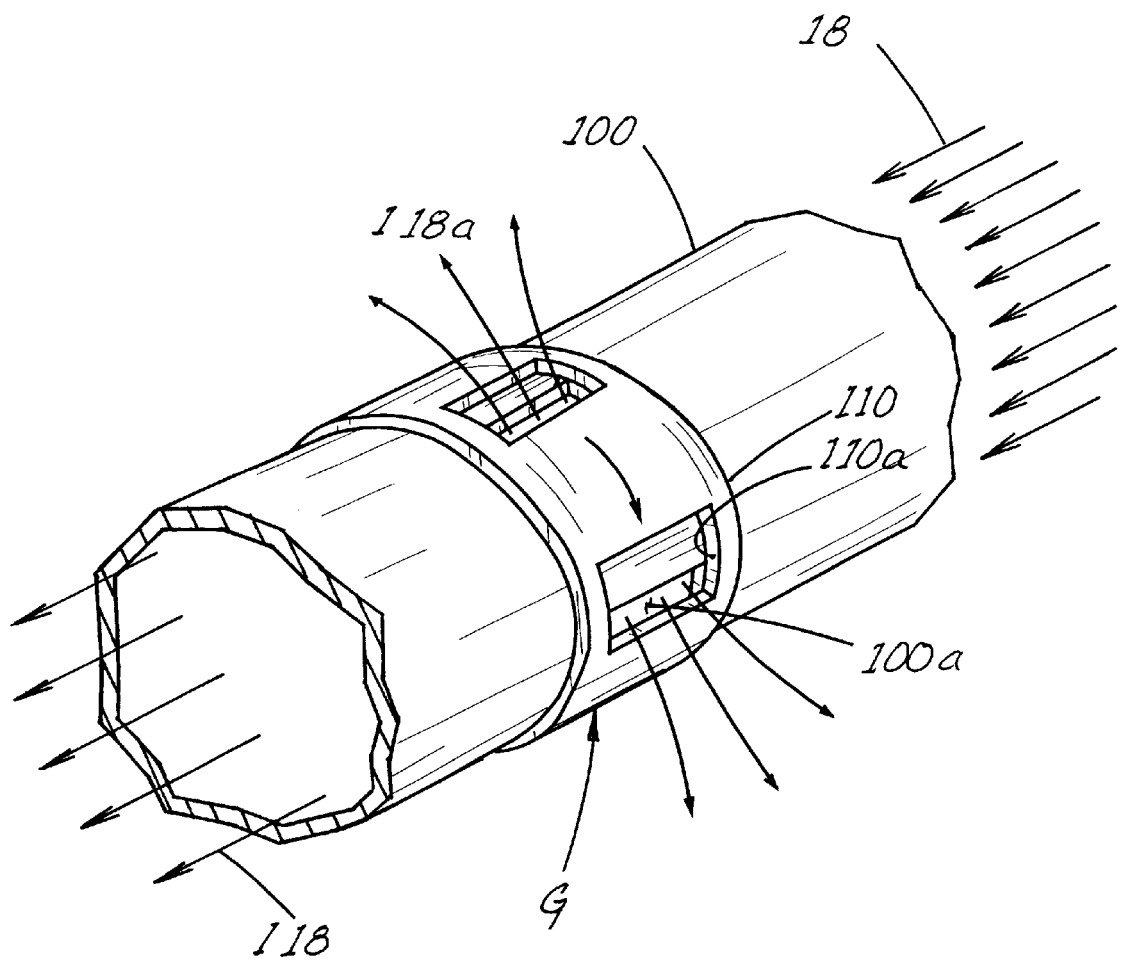
FIG. 10 is a perspective view illustrating an air control for a fogger apparatus according to the invention.

Referring now to FIGS. 9A and 9B, further embodiments of a mist or fogging device are illustrated wherein an expansion or divergent section 90 is provided at the end of blower tube 12 along with a convergent nozzle 92 for controlling the flow. In a like manner, a flow control device F is provided to control the flow of fluid and hence the mist characteristics. It is noted that distance 72 in this embodiment may also be adjusted by pulling tube 62 to the left or to the right relative to housing 94 of flow control device F. In FIG. 9B, there is a flow constriction section 98 attached to blower tube 12 which terminates in a nozzle section 100 having a dual or divergent nozzle 102. Likewise, a flow control device F is provided which includes a forked dispensing tube 104 having a pair of diverging tubes 104a and 104b for delivering fluid into airflow 118 coming from the tube barrels of the dual nozzle. Other shapes of nozzles to affect the air flow pattern, and the forming of air control currents, such as rifling grooves in the barrel interior, may also be used to control the air velocity and currents. In addition, an air control device, designated generally as G, may be provided which allows air 118a to bleed to the environment from airflow 118, as can best be seen in FIG. 10. For this purpose, air control device G may include a rotatable sleeve 110 carried around the barrel of tube section 100 having valve openings 110a formed in the sleeve. Likewise, there are openings 100a formed in tube section 100 which may be more or less open or blocked depending on the rotation of sleeve 110 to vary the amount of air bled from airflow 118. This further adds control over the characteristics of the fog or mist emitted from the blower device.

What is claimed is:

1. Fogger apparatus for distributing a mist of liquid treatment materials comprising:

a portable blower for creating an airflow having an inlet and an outlet;

a handheld blower tube connected in fluid communication to the outlet of the blower though which said airflow is delivered, and said blower tube has an exit end through which the exiting airflow exits said blower tube;

an air control device carried by said blower tube for selectively controlling the airflow through said blower tube;

a container for containing a liquid material to be dispensed as a mist;

a feed tube connected to said container for delivering said liquid from said container;

a dispensing nozzle in fluid communication with said feed tube having a free end terminating near said exit end of said tube for distributing liquid material into said exiting air flow; and a spray control device positioned on said feed tube and carried by said blower tube before said dispensing nozzle for controlling the characteristics of the mist formed by said liquid being injected into said exiting airflow.

2. The apparatus of claim 1 wherein said spray control device includes a valve for controlling the flow of liquid material through said tube so that the amount of liquid material distributed into said exiting airflow is metered.

3. The apparatus of claim 2 wherein said spray control device includes means for adjusting the distance between a free end of said dispensing nozzle and said free end of said blower tube.

4. The apparatus of claim 2 wherein said valve includes a valve passage; and a valve element for adjustably blocking said valve passage to control the amount of fluid through said valve passage and hence said feed tube.

5. The apparatus of claim 4 wherein said feed tube extends into and through said valve passage; and said valve includes a valve body having a protuberance which protrudes into the valve passage and cooperates with said valve element to selectively pinch off said feed tube to control the flow of liquid there through.

6. The apparatus of claim 1 wherein said spray control device comprises a valve having a valve body with a valve passage;

said feed tube extending through said valve passage;

said dispensing nozzle being in fluid communication with said feed tube so that said feed tube may be pulled toward or away from said free end of said blower tube to vary a distance between said free end of said dispensing nozzle and said free end of said blower tube to thereby control the mist characteristics of the mist resulting from injection of said liquid material into said exiting airflow.

7. The apparatus of claim 6 wherein said valve controls the amount of fluid flow through said passage.

8. The apparatus of claim 7 wherein said valve passage includes a protuberance and said valve includes a valve element which closes off said feed tube against said protuberance as said valve element is slid in one direction to control the flow of fluid in said feed tube and allows said feed tube to be pulled toward and away from said exit end.

9. The apparatus of claim 1 wherein said spray control device comprises means for mounting and adjusting the longitudinal position of said dispensing nozzle so that the position of said free end of said nozzle may be set relative to said free end of said blower tube.

10. The apparatus of claim 9 wherein said spray control device includes a valve for controlling the amount of fluid flow in said feed tube.

11. The apparatus of claim 10 wherein said exit end includes divergent section upstream from a convergent section of said blower tube.

12. The apparatus of claim 1 wherein said dispensing nozzle comprises a plurality of dispensing barrels in communication with said feed tube.

13. The apparatus of claim 1 wherein said dispensing nozzle comprises a nozzle section having a divergent nozzle.

14. The apparatus of claim 1 wherein said air control device comprises an adjustable air bleed for bleeding air from said exiting airflow into the ambient.

15. The apparatus of claim 14 wherein said metering means includes:

means for controlling the velocity of air flow through said tube; said valve including an adjustable valve element to provide a desired metering opening; and a diameter of said feed conduit being of a pre-selected size.

16. The apparatus of claim 1 wherein said breeding solution is one of a *Bacillus thuringiensis* solution.

17. The apparatus of claim 1 wherein said container includes a backpack container to be carried by an operator.

18. The apparatus of claim 1 including means for connecting said feed tube to an outside water source providing a generally continuous supply of water to said feed conduit.

19. Apparatus for distributing a treatment material comprising:

a portable blower for creating an airflow having an inlet and an outlet;

a handheld blower tube connected in fluid communication to the outlet of the blower though which said airflow is delivered, and said blower tube has an exit end through which the exiting airflow exits said blower tube;

a stack of tanks containing a bacterial breeding solution, a top one of said tanks being a dispensing container from which fluid is drawn;

a feed conduit carried by said blower tube connected on one end to said tanks and having a second, free end terminating near said exit end of said blown tube for distributing said fluid into said exiting air flow; and, a valve for controlling the flow of said fluid through said conduit.

20. The apparatus of claim 19 including metering means for metering the amount of said fluid distributed into said exiting airflow.

21. Fogger apparatus for distributing a mist of liquid treatment material comprising:

a handheld blower tube connected to a blower by which an airflow is created, and said blower tube has an exit end through which an exiting airflow exits;

an air control device carried by said blower tube for selectively controlling the airflow through said blower tube.

a feed tube for connection to a container which contains a liquid material to be dispensed as a mist;

a dispensing nozzle in fluid communication with said feed tube having a free end terminating near said exit end of said blower tube for distributing liquid material into said exiting air flow; and a control device on said feed tube carried by said blower tube before said dispensing nozzle for controlling the characteristics of said liquid being injected into said exiting airflow to form a desired mist spray.

22. The apparatus of claim 21 wherein said spray control device includes a valve for controlling the flow of liquid material through said tube so that the amount of liquid material distributed into said exiting airflow is metered.

23. The apparatus of claim 22 wherein said control device includes means for adjusting the distance between a free end of said dispensing nozzle and said exit end of said blower tube.

24. The apparatus of claim 21 wherein said control devices includes means for adjusting the distance between a free end of said dispensing nozzle and said exit end of said blower tube.

25. The apparatus of claim 21 including a gravity feed for feeding liquid from said container.

* * * * *